(12) United States Patent
Moro et al.

(10) Patent No.: US 7,729,045 B2
(45) Date of Patent: Jun. 1, 2010

(54) AMPLIFIER CHAIN FOR GENERATING ULTRASHORT DIFFERENT WIDTH LIGHT PULSES

(75) Inventors: Vincent Moro, Viry Chatillon (FR); Franck Falcoz, Dourdan (FR)

(73) Assignee: Thales (FR)

( * ) Notice: Subject to any disclaimer, the term of this patent is extended or adjusted under 35 U.S.C. 154(b) by 607 days.

(21) Appl. No.: 11/571,551

(22) PCT Filed: Jul. 1, 2005

(86) PCT No.: PCT/EP2005/053147

§ 371 (c)(1),
(2), (4) Date: Jan. 2, 2007

(87) PCT Pub. No.: WO2006/003185

PCT Pub. Date: Jan. 12, 2006

(65) Prior Publication Data

US 2008/0043789 A1   Feb. 21, 2008

(30) Foreign Application Priority Data

Jul. 2, 2004   (FR) .................................. 04 07389

(51) Int. Cl.
  *H01S 4/00* (2006.01)
  *H01S 3/10* (2006.01)
(52) U.S. Cl. ........................ 359/333; 359/348; 372/25
(58) Field of Classification Search ................ 359/333, 359/348; 372/25
See application file for complete search history.

(56) References Cited

U.S. PATENT DOCUMENTS

| 3,748,015 | A | * | 7/1973 | Offner | 359/366 |
| 4,928,316 | A | | 5/1990 | Heritage et al. | |
| 5,349,591 | A | * | 9/1994 | Weston et al. | 372/25 |
| 5,960,016 | A | * | 9/1999 | Perry et al. | 372/25 |
| 6,081,543 | A | * | 6/2000 | Liu et al. | 372/102 |
| 6,603,600 | B2 | * | 8/2003 | Pang | 359/348 |
| 6,739,728 | B2 | * | 5/2004 | Erbert et al. | 359/615 |
| 6,888,976 | B2 | * | 5/2005 | Cormack et al. | 385/16 |

FOREIGN PATENT DOCUMENTS

| FR | 2751095 A1 | 9/1996 |
| FR | 2 834 080 A | 6/2003 |
| FR | 2834080 A1 | 6/2003 |
| WO | 95 20178 A | 7/1995 |
| WO | 9520178 A1 | 7/1995 |

\* cited by examiner

*Primary Examiner*—Eric Bolda
(74) *Attorney, Agent, or Firm*—Lowe Hauptman Ham & Berner, LLP

(57) ABSTRACT

The present invention relates to an amplifier chain for generating ultrashort light pulses of different pulse durations and applies in particular to amplifier chains suitable for amplifying picosecond and femtosecond pulses. The amplifier chain comprising a stretcher with at least one entry dispersive element of the grating type and intended to temporally stretch an incident pulse, an amplifying medium designed to amplify said stretched pulse, a compressor with at least one entry dispersive element substantially identical to that of the stretcher, designed to temporally compress said amplified pulse. According to the invention, the stretcher and the compressor include means for moving the dispersive elements between first and second positions, in such a way that the angle of incidence in a first position is equal to the angle of diffraction in the second position, and vice versa, allowing two degrees of stretch of the chain to be defined, each adapted to the amplification of pulses of different durations.

16 Claims, 3 Drawing Sheets

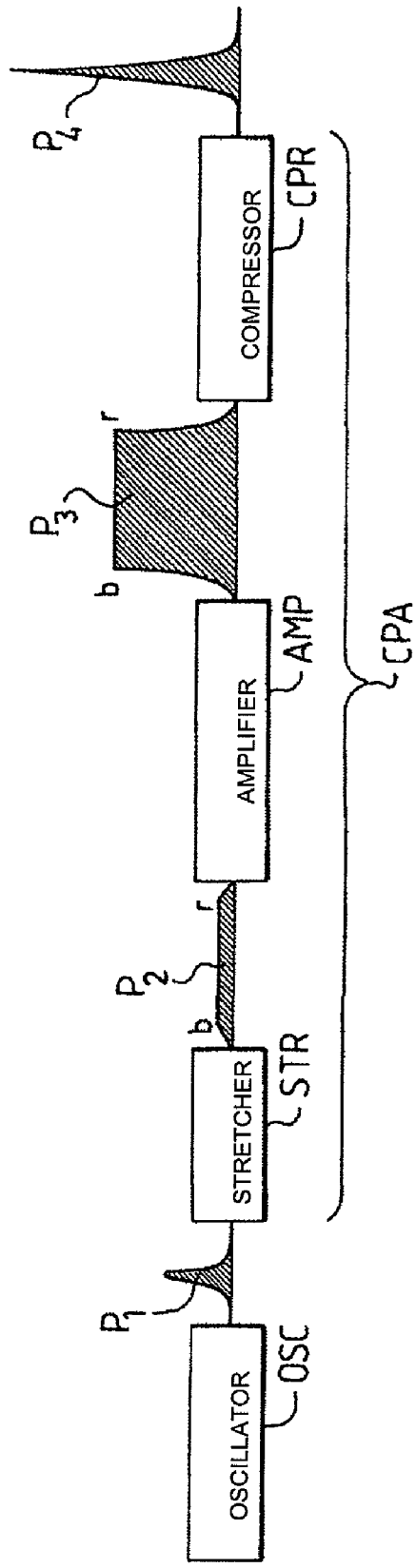

US 7,729,045 B2

AMPLIFIER CHAIN FOR GENERATING ULTRASHORT DIFFERENT WIDTH LIGHT PULSES

CROSS-REFERENCE TO RELATED APPLICATIONS

The present Application is based on International Application No. PCT/EP2005/053147 filed on Jul. 1, 2005 which in turn corresponds to France Application No. 04 07389 filed on Jul. 2, 2004 and priority is hereby claimed under 35 USC §119 based on these applications. Each of these applications are hereby incorporated by reference in their entirety into the present application.

TECHNICAL FIELD

The present invention relates to an amplifier chain for generating ultrashort light pulses of different pulse durations and applies in particular to amplifier chains suitable for amplifying picosecond and femtosecond pulses.

BACKGROUND OF THE INVENTION

The technique of Chirped Pulse Amplification or CPA is at the present time frequently used to amplify short light pulses. Direct amplification of ultrashort pulses (typically lasting from a few tens of femtoseconds to a few picoseconds) will result in deterioration of the optical components of the amplifier well before the desired energy level is reached.

The principle of a CPA chain is described in FIG. 1. The initial pulse $P_1$ output by a laser oscillator OSC is temporally stretched by a stretcher STR in such a way that the duration of the pulse is increased by a factor of typically from 1000 to 5000. The stretched pulse $P_2$ can then be amplified by an amplifier AMP without damaging it. The resulting amplified pulse $P_3$ is then compressed by a compressor CPR in order to reach its initial pulse duration, making it possible to obtain an ultrashort high-power pulse $P_4$.

The process of temporally stretching the incident pulse must be perfectly reversible. Consequently, it is not possible for example to carry out spectral filtering so as to lengthen the duration of the pulse. The technique commonly used consists in utilizing the dispersive properties of dispersive elements of the prism or grating type so as to make the various wavelengths of the incident pulse, the spectral width of which is large (typically a few tens of nanometers) follow an optical path of different length. On exiting the stretcher, the pulse $P_2$ (see FIG. 1) thus has a temporal dispersion of the wavelengths, the shorter-wavelength "blue" (denoted by b) having traveled a longer optical path than the longer-wavelength "red" (denoted by r). To carry out this function, the stretcher comprises, for example, two dispersive elements of the grating type and an afocal system between the gratings for reversing the sign of the dispersion of the grating, or a catadioptric afocal system, allowing only a single grating to be used. Conventionally, the compressor uses dispersive elements very similar to those used in the stretcher and operating with substantially similar angles of incidence, but without the afocal system, so as to make the short wavelengths follow a shorter optical path than the long wavelengths in such a way as to recompress the pulse.

In the field of short-pulse amplifier chains, many applications require the generation of pulses that can be temporally tuned from a few tens of femtoseconds to a few picoseconds without departing from the Fourier limit. In the chains of the prior art, it is necessary, in order to go from amplifying femtosecond pulses to picosecond pulses, to modify the configuration of both the stretcher and the compressor of the CPA chain and to change some of the optical components, especially the gratings. This requires the chain to be realigned. Such a realignment in general requires the intervention of a technical expert.

SUMMARY OF THE INVENTION

The invention proposes an amplifier chain having a particular architecture that makes it possible to go from femtosecond pulse amplification mode to picosecond pulse amplification mode, in an extremely simple manner, without either changing components or realigning the chain. Moreover, the use of identical components in both operating modes reduces the cost of the chain compared with the chains of the prior art. According to the invention, this operation consists in rotating the gratings of the stretcher and compressor, allowing the amount of stretch of the chain to be changed so as to adapt the stretching to the duration of the initial pulse.

More precisely, the invention proposes an amplifier chain for generating ultrashort pulses of different pulse durations, comprising:

a stretcher with at least one entry dispersive element of the grating type and intended for temporally stretching an incident pulse of given pulse duration, said pulse having, on said dispersive element, a given angle of incidence and a given angle of diffraction, defining a given degree of stretch by the stretcher;

an amplifying medium intended to amplify said stretched pulse; and a compressor with at least one entry dispersive element, substantially identical to that of the stretcher, which is intended for temporally compressing said amplified pulse in such a way that the duration of the pulse thus compressed is substantially equal to that of the incident pulse, where in that the stretcher and the compressor include means for moving said dispersive elements between first and second positions in such a way that the angle of incidence in a first position is equal to the angle of diffraction in the second position, and vice versa, making it possible to define two degrees of stretch of the chain, each suitable for amplifying pulses of different durations.

Still other advantages of embodiments according to the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

Other advantages and features will become more clearly apparent on reading the following description which is illustrated by the appended figures which show:

FIG. 1, the principle of a CPA chain (already described);

In the figures, identical elements are indicated by the same references.

DETAILED DESCRIPTION

Figure 2A:
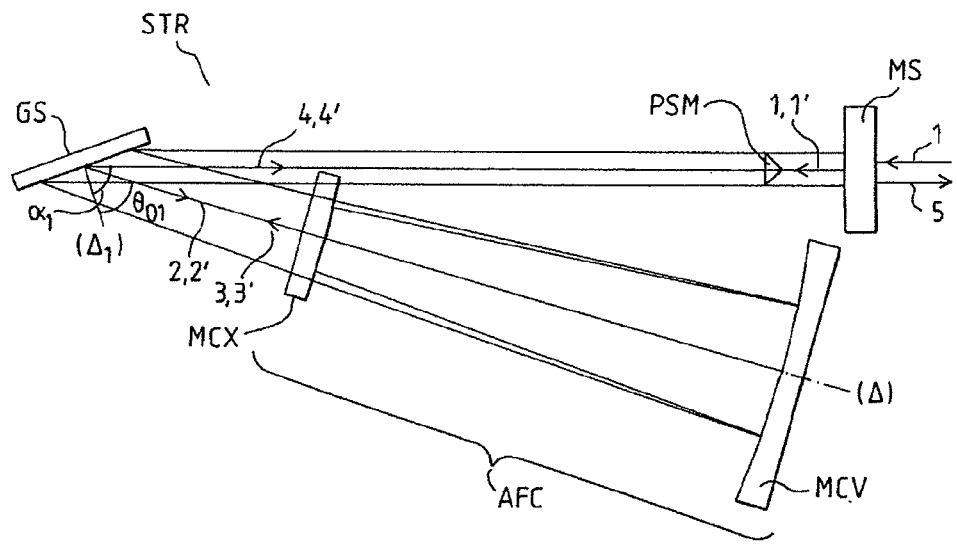
FIGS. 2A and 2B, diagrams of the stretcher and the compressor of a chain according to the invention, in a first operating mode.
Figure 2B:
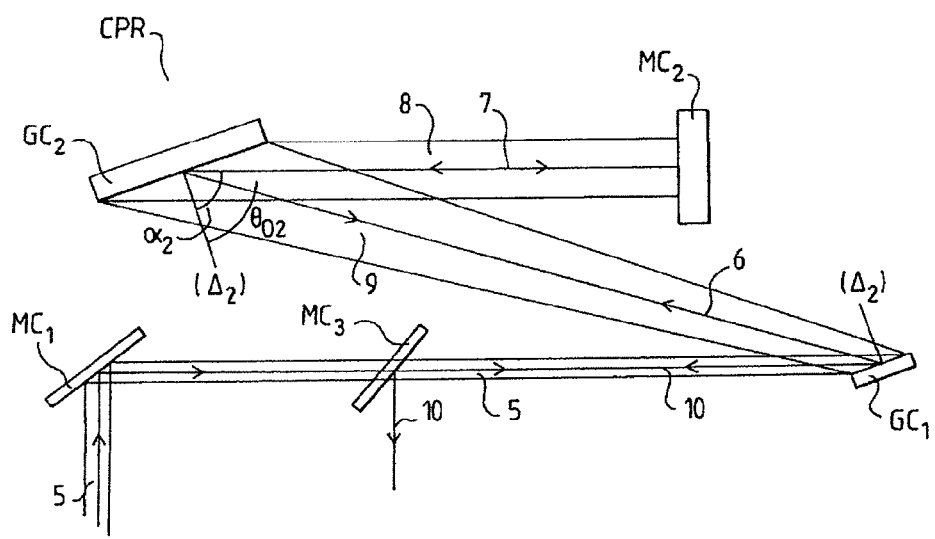

FIGS. 2A and 2B illustrate diagrams showing the principle of a stretcher STR and a compressor CPR in a CPA-type amplifier chain according to the invention. The stretcher STR according to the example shown in FIG. 2A comprises an entry diffractive element GS of the grating type, and intended to receive, at a given angle of incidence $\alpha_1$, an incident pulse 1 of given central wavelength $\lambda_0$, given spectral width $\Delta\lambda$ and given pulse duration $\tau$. It also includes a catadioptric afocal optical system AFC, formed from a concave mirror MCV and from a convex mirror MCX such that the radius of curvature of the concave mirror is twice that of the convex mirror, both mirrors being centered on a common axis ($\Delta$), the axis ($\Delta$) being oriented with respect to the grating GS in such a way that the diffracted beam at the central wavelength $\lambda_0$ arrives at normal incidence on the concave mirror MCV. Other configurations known from the prior art are possible as regards the stretcher, such as for example the use of a dioptric afocal system between an entry diffractive element and an exit diffractive element. The variant described in FIG. 2A is preferred for reasons of compactness and quality of the resulting beam. The stretching principle, known from the prior art, will be briefly recalled. The incident beam 1 penetrates the entry grating GS of the stretcher at an angle of incidence $\alpha_1$ to the normal ($\Delta_1$) of the grating. The pulse is diffracted (beam denoted by 2 on FIG. 2A) in an angle of diffraction $\theta_{01}$ at the central wavelength $\lambda_0$ of the incident pulse and with an angular difference $\Delta\theta$ between the shortest wavelength and the longest wavelength according to the conventional grating formula:

$$\sin \alpha_1 + \sin \theta(\lambda) = N\lambda \quad (1)$$

where N is the number of lines of the grating per unit length and $\theta(\lambda)$ is the angle of diffraction at the wavelength $\lambda$.

For the sake of clarity, only the beam at the central wavelength $\lambda_0$ is shown in FIG. 2A. The beam passes through the afocal system AFC, then the beam 3 exiting the afocal system is again diffracted by the grating GS, to form a beam 4 offset with respect to the entry beam 1 (along the direction perpendicular to the plane of the figure). A reflection device MS reflects said beam 4 in the opposite direction (beam 1') so as to complete the pulse stretching process. The beam 1' thus reflected follows the same path (1', 2', 3', 4') as the incident beam 1 so as to form a collimated beam 5 parallel to the incident beam 1. According to a variant, a prism PSM allows a second passage through the stretcher. Thanks to the diffractive element GS, the various spectral components of the pulse follow paths of different lengths. The group time $t_g(\lambda)$, that is to say the time needed for each spectral component $\lambda$ to pass through the device, is then a nonconstant wavelength-dependent function. In the case of the stretcher, owing to the presence of the afocal system, this function is a decreasing function (it is an increasing function in the compressor, which conventionally has a similar geometry, but without the afocal system).

The degree of stretch $dt_g/d\lambda(\lambda)$ by the stretcher is defined as the stretched duration per unit spectral width of the incident beam. It is calculated by deriving the expression for the group time $t_g(\lambda)$. It may be shown that the degree of stretch is expressed as follows:

$$dt_g/d\lambda(\lambda) = 4paN^2\lambda/c \cdot \cos^2\theta_0 \quad (2)$$

where c is the velocity of light in vacuo, p is the number of passes through the stretcher (in this example, 2), N is the number of lines of the grating per unit length and a is the distance between the entry grating and the focal plane of the concave mirror (or the half-distance between the two gratings in the case of a stretcher with a dioptric afocal system). Conventionally, the stretched pulse is then amplified by an amplifying medium (not shown) and then compressed by the compressor, so as to recover its initial pulse duration.

The stretched and amplified pulse 5 is then directed (in this example by means of a first return mirror $MC_1$) to the compressor CPR. Conventionally, it comprises an optic (not shown) for shaping the incident pulse, then two identical gratings $GC_1$ and $GC_2$ placed parallel to each other, and a return mirror $MC_2$ and an exit mirror $MC_3$. The gratings $GC_1$ and $GC_2$ are dimensioned and designed to compress the incident pulse 5 in the compressor in such a way that the pulse exiting the compressor has a pulse duration substantially identical to that of the incident pulse 1 in the amplifier chain. In practice, it is rare for the pulse duration to be strictly identical, but it is endeavored to approach this situation. Thus, the pulse 5 arrives on the grating $GC_1$ at an angle of incidence $\alpha_2$ to the normal ($\Delta_2$) of the grating, then is diffracted with an angle of diffraction $\theta_{02}$ at the central wavelength $\lambda_0$. The diffracted pulse 6 is then sent to the second grating $GC_2$, which is identical to $GC_1$ and parallel to it, in such a way that the diffracted pulse 7 is collimated. The pulse 7 is then sent back into the compressor by the return mirror $MC_2$ following the reverse path (8, 9, 10). The compressed pulse 10 is then ejected from the compressor by the exit mirror $MC_3$. A folded configuration with only a single grating is also possible.

In the field of short-pulse amplifier chains, many applications require the generation of either femtosecond pulses, for temporal resolution, or picosecond pulses, for spectral resolution. For example, it is possible to use an oscillator capable of generating picosecond or femtosecond pulses. Conventionally, the aim is to obtain a stretch duration for the exit pulse 5 of the order of 100 ps at least, for which duration the amplification can take place without damage. The stretcher and the compressor are thus dimensioned so as to obtain a degree of stretch adjusted to the duration of the incident pulse. In the chains of the prior art, when it is desired to work both with femtosecond and picosecond incident pulses, it is then necessary in order to adjust the degree of stretch, to modify the configuration of the stretcher and the compressor of the CPA chain and to change certain optical components, especially the gratings. This requires realignment of the chain. Such a realignment is complicated. Moreover, it requires components specific for operation in femtosecond mode and specific for operation in picosecond mode, which is expensive.

The amplifier chain according to the invention has a particular architecture that makes it possible, by a simple operation and without changing the components of the chain, to switch from one temporal operating mode to another. To do this, the stretcher and the compressor include means for moving the dispersive elements of the stretcher and the compressor, for example rotation means, allowing these elements to be swung from a first position to a second position in such a way that the angle of incidence in a first position is equal to the angle of diffraction in the second position, and vice versa, making it possible to define two degrees of stretch of the chain, each adapted to the amplification of pulses of different given durations. For the sake of clarity, the rotation means have not been shown in the figures. For example, the rotation means are formed by a turntable. Alternatively, mechanical preferences may be used to define said positions of the dispersive elements.

Figure 3A:
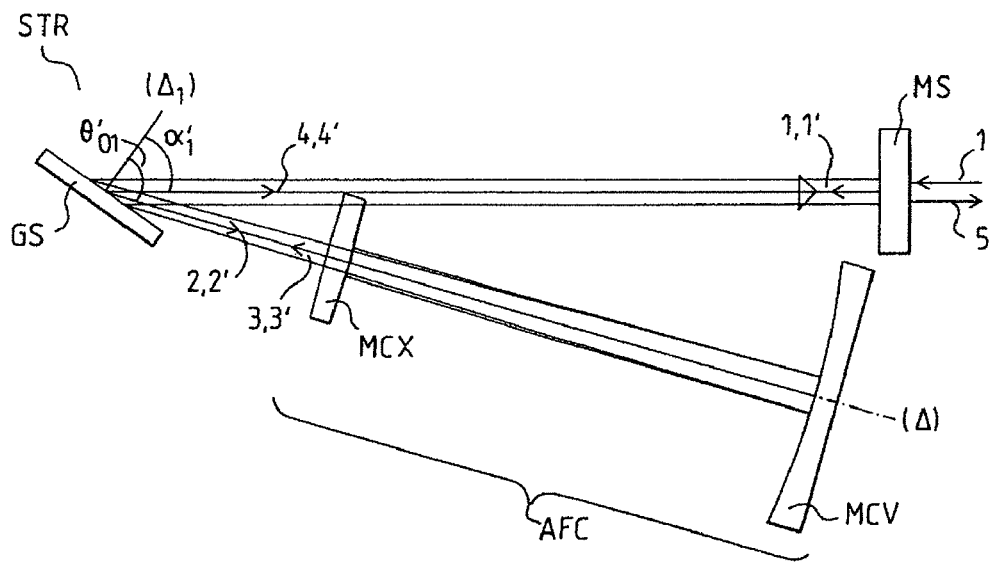
FIGS. 3A and 3B, diagrams of the stretcher and compressor of the chain described in FIGS. 2A and 2B, in a second operating mode.
Figure 3B:
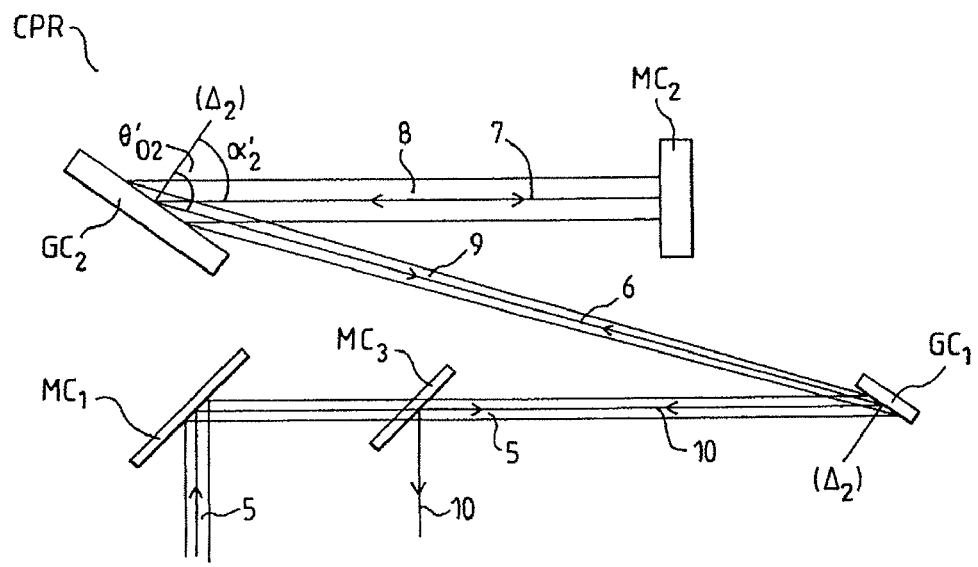

FIGS. 2A and 2B thus show, according to one illustrative example of the invention, the stretcher and compressor of an amplifier chain according to the invention in a first operating mode and FIGS. 3A and 3B show the stretcher and compressor of the same amplifier chain in a second operating mode.

In the first operating mode (FIGS. 2A, 2B), the angle of incidence $\alpha_1$ and the angle of diffraction $\theta_{01}$ of the incident pulse 1 on the entry grating GS of the stretcher STR are such that $\alpha_1 > \theta_{01}$. The degree of stretch, given by equation (2) above, has a value sufficient to stretch the incident pulses from a few tens of femtoseconds for example to around 100 picoseconds. The angle of incidence $\alpha_2$ and angle of diffraction $\theta_{02}$ of the incident pulse 5 on the entry grating $GC_1$ of the compressor CPR are substantially identical to the angle of incidence $\alpha_1$ and angle of diffraction $\theta_{01}$ of the incident pulse 1 on the entry grating GS of the stretcher STR.

In the second operating mode (FIGS. 3A and 3B), the gratings GS, $GC_1$ and $GC_2$ have been swung into a second position in such a way that the angle of incidence $\alpha'_1$ and angle of diffraction $\theta'_{01}$ of the incident pulse 1 on the entry grating GS of the stretcher STR are such that $\alpha'_1 < \theta'_{01}$, the absolute values of the differences between the incident angle and diffracted angle remaining the same in the two positions. In the same way, the gratings $GC_1$ and $GC_2$ are swung in such a way that, once again, the angle of incidence $\alpha'_2$ and angle of diffraction $\theta'_{02}$ of the incident pulse 5 on the entry grating $GC_1$ and of the incident pulse 6 on the grating $GC_2$ of the compressor CPR are substantially identical to the angle of incidence $\alpha'_1$ and angle of diffraction $\theta'_{01}$ of the incident pulse 1 on the entry grating GS of the stretcher STR. In this second operating mode, the diffracted angle is larger than the incident angle and the degree of stretch is therefore in absolute value, larger than that obtained in the first operating mode, making it possible to stretch longer pulses (duration of the order of a picosecond), having narrower spectral width than femtosecond pulses, to stretched pulse durations of the order of a hundred picoseconds. Moreover, since between the two positions there is an inversion in the values of the angles of incidence and diffraction, the geometry remains the same. This allows the degree of stretch to be changed without the other parameters of the chain being modified. In other words, whether in the first operating mode (FIGS. 2A, 2B) or in the second operating mode (FIGS. 3A, 3B), the beams (5) exiting the stretcher STR are extracted at exactly the same position and can therefore be injected into the compressor without realigning it, and the beams (10) exiting the compressor are also extracted in the same position in both operating modes.

This novel configuration of the amplifier chain according to the invention thus has a remarkable advantage over the chains of the prior art.

The applicant has for example shown that an amplifier chain for amplifying pulses ranging from a few tens of femtoseconds to a few hundred femtoseconds duration, with a central wavelength approximately equal to 800 nm, can be produced with the following parameters:

a double-pass stretcher, comprising a diffraction grating with a number of lines of about 2200 per mm and a catadioptric Öfner-triplet afocal system;

a compressor comprising two substantially identical, parallel gratings, the number of lines of which is also 2200 per mm; and the angle of incidence and angle of diffraction on the entry grating of the stretcher and of the compressor are substantially identical, about 70° and 55°, or vice versa, depending on the position of said gratings.

Of course, the example described above is not limiting and many alternative embodiments are possible, depending on the desired characteristics of the chain.

In particular, different types of filter means may be provided so as to adapt the spectral width of the incident pulse, making it possible to vary the spectral width of the pulse output by the oscillator, and therefore its duration. For example, the filter means comprise an interference filter or they may be formed by a mask positioned in a Fourier plane of the stretcher. According to one embodiment, the filter means comprise a programmable filter of the AOPDF (Acousto-Optic Programmable Dispersive Filter) type, allowing fine continuous tuning of the pulse duration in each of the configurations. A filter of this type is for example described in French Patent FR 2 751 095 in the name of the Applicant.

The invention also relates to a laser source for generating ultrashort pulses of variable pulse duration, comprising one or more laser oscillators and an amplifier chain according to the invention, as described above.

According to a variant, an oscillator is used, at the output of which filter means are provided, such as those described above. Several oscillators may also be employed, allowing pulses of different given spectral widths to be delivered. It is also possible to have a laser oscillator for delivering pulses of a variable spectral width and an amplifier chain such as that described above.

It will be readily seen by one of ordinary skill in the art that embodiments according to the present invention fulfill many of the advantages set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. An amplifier chain for generating ultrashort pulses of different pulse durations, comprising:

a stretcher for stretching an incident pulse to create a stretched pulse, the stretcher comprising a first dispersive element selectively operable at two positions, and an angle of incidence in one of the positions is equal to an angle of diffraction in the other of the positions, and vice versa;

an amplifying medium for amplifying said stretched pulse to create an amplified pulse;

a compressor for compressing said amplified pulse, the compressor comprising a second dispersive element selectively operable at two positions, and an angle of incidence in one of the positions is equal to an angle of diffraction in the other of the positions, and vice versa; and a rotating device configured to selectively move said first dispersive element between the two positions of the first dispersive element, and selectively move said second dispersive element between the two positions of the second dispersive element.

2. The amplifier chain as claimed in claim 1, wherein said rotating device comprises a turntable.

3. The amplifier chain as claimed in claim 1 wherein the angle of incidence and the angle of diffraction for one of the positions of the first dispersive element are the same as the angle of incidence and the angle of diffraction for one of the positions of the second dispersive element, respectively.

4. The amplifier chain as claimed in claim 1, wherein the stretcher comprises an afocal system, a third dispersive element substantially identical to the first dispersive element, and another rotating device configured to move said third dispersive element to be parallel to said first dispersive element.

5. The amplifier chain as claimed in claim 1, wherein the stretcher comprises an afocal system with an Öfner triplet, said afocal system being catadioptric and formed from a concave mirror and from a convex minor.

6. The amplifier chain as claimed in claim 1, wherein the compressor comprises a fourth dispersive element identical to the second dispersive element, and another rotating device configured to move fourth dispersive element to be parallel to said second dispersive element.

7. The amplifier chain as claimed in claim 6 further comprises a catadioptric Öfner-triplet afocal system and is configured to generate pulses of variable subpicosecond pulse duration, with a central wavelength substantially equal to 800 nm, wherein the first dispersive element is a grating having about 2200 lines per mm, the second and fourth dispersive elements are identical gratings each having approximately 2200 lines per mm, and the angles of incidence and the angles of diffraction for the first, second, and fourth dispersive elements are equal to 70° and 55°, or vice versa depending on the positions of said dispersive elements.

8. The amplifier chain as claimed in claim 1, further comprises a filter means for adapting a spectral width of the incident pulse.

9. The amplifier chain as claimed in claim 8, wherein said filter means comprise a programmable filter of the AOPDF type.

10. The amplifier chain as claimed in claim 8, wherein said filter means comprise an interference filter.

11. The amplifier chain as claimed in claim 8, wherein said filter means are formed by a mask positioned in a Fourier plane of the stretcher.

12. A laser source for generating ultrashort pulses of variable pulse duration, comprising one or more laser oscillators for delivering pulses of a given spectral width and an amplifier chain as claimed in claim 1.

13. The laser source for generating ultrashort pulses of variable pulse duration, comprising at least one laser oscillator for delivering pulses of a variable spectral width and an amplifier chain as claimed in claim 1.

14. The amplifier chain as claimed in claim 2 wherein the angle of incidence and the angle of diffraction for one of the positions of the first dispersive element are the same as the angle of incidence and the angle of diffraction for one of the positions of the second dispersive element, respectively.

15. The amplifier chain as claimed in claim 2, wherein the stretcher comprises an afocal system, a third dispersive element substantially identical to the first dispersive element, and another rotating device configured to move said third dispersive element to be parallel to said first dispersive element.

16. The amplifier chain as claimed in claim 3, wherein the stretcher comprises an afocal system, a third dispersive element substantially identical to the first dispersive element, and another rotating device configured to move said third dispersive element to be parallel to said first dispersive element.

* * * * *